No. 838,080. PATENTED DEC. 11, 1906.
E. KEYSER.
VEHICLE WHEEL.
APPLICATION FILED MAR. 14, 1906.

Witnesses
Edward Rowland
William H. Mohr.

Inventor
Edward Keyser
By his Attorney

UNITED STATES PATENT OFFICE.

EDWARD KEYSER, OF POUGHKEEPSIE, NEW YORK.

VEHICLE-WHEEL.

No. 838,030.  Specification of Letters Patent.  Patented Dec. 11, 1906.

Application filed March 14, 1906. Serial No. 305,942.

*To all whom it may concern:*

Be it known that I, EDWARD KEYSER, a citizen of the United States, residing at Poughkeepsie, in the county of Dutchess, State of New York, have invented certain new and useful Improvements in Vehicle-Wheels, of which the following is a specification.

My invention relates to that class of wheels wherein a pneumatic cushion surrounds the hub of the wheel and receives the impact of collapsible spokes, so as to allow a flexible rim to yield to the inequalities of the roadway; and my improvements consist of the particulars hereinafter more fully set forth.

Figure 1:
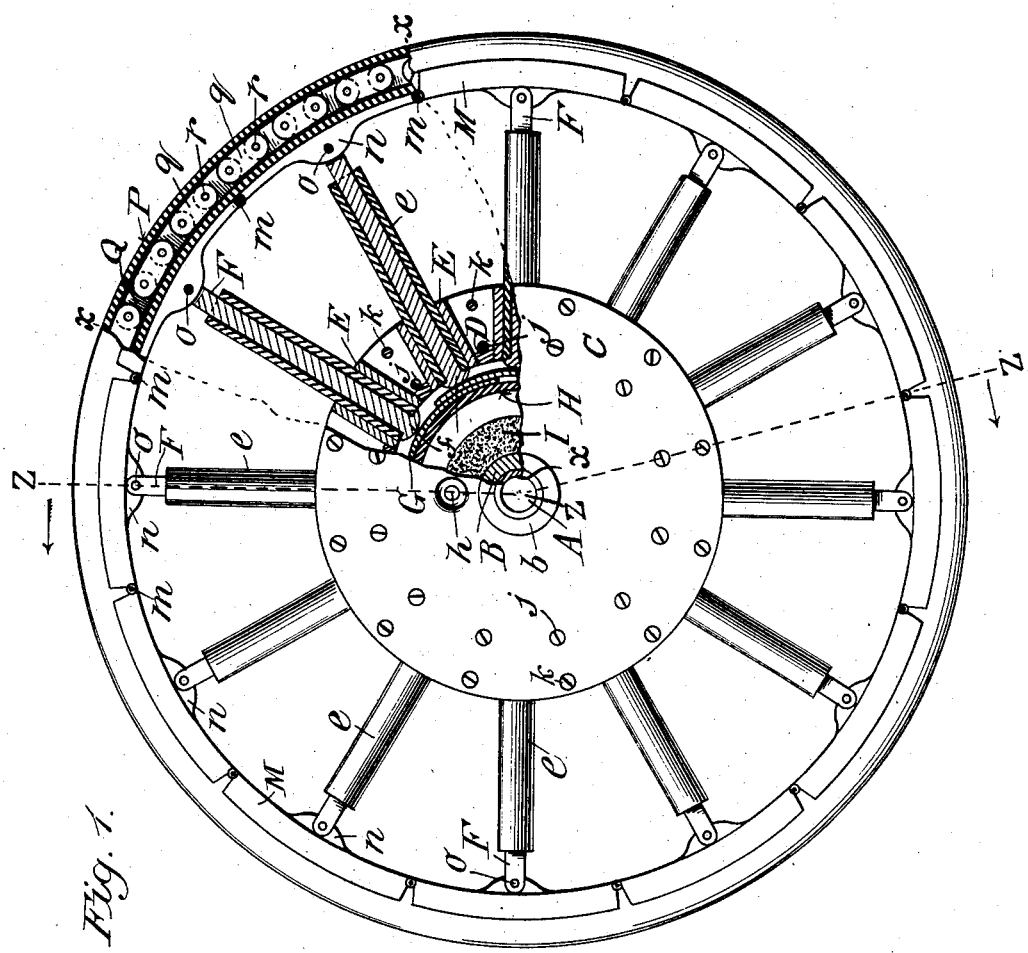
Figure 2:
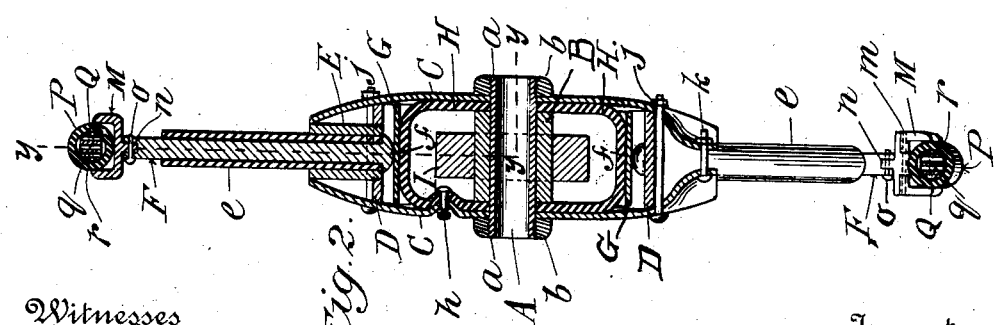

In the drawings, Figure 1 is a side elevation of one of my improved wheels, the portion thereof embraced by the line $x\,x\,x$ being shown in section, taken on a vertical line similar to the line $y\,y\,y$ of Fig. 2; and Fig. 2 is a vertical cross-sectional view taken on the line $z\,z\,z$ of Fig. 1.

Similar letters of reference designate similar parts in both the figures.

The hub of the wheel is formed of a metal tube A, reinforced, secondarily, by a sleeve B and having a dished disk C applied over each of its ends and retained thereupon by the nuts $b\,b$, engaging with the threaded ends $a\,a$ of the hub A.

D is a metal ring held between the disks C C and having sleeves E E, threaded into and securely attached to it. These sleeves are reinforced and extended by supplemental sleeves $e\,e$, through which work the piston-spokes F, having their bases expanded into enlarged heads $f\,f$, which play upon a flexible steel band G, the ends of which are lapped, as shown in Fig. 1, without being fastened together, so as to permit the contraction and expansion of the hoop formed by the spring.

Within the spring G, I place a rubber air-cushion H, provided with central apertures, through which the ends of the hub A are passed, after which the disks C C are slipped onto the hub and the nuts $b\,b$ screwed firmly down, thus clamping the edges of the air-cushion between the reinforcing-sleeve of the hub and the disks C C and making an air-tight connection between them. A suitable air-valve $h$ is passed through one of the disks C and connected with the pneumatic cushion H.

Inside of the air-cushion and around the reinforcing-sleeve D D, I place a solid-rubber ring I, which serves to receive the impact of the spokes if the pressure is sufficient to drive the top of the air-cushion down into contact with the ring I.

The disks C C are further secured together by bolts $k\,k$ and $j\,j$, the bolts $j\,j$ serving to center the ring D in its proper position.

The felly of the wheel is formed of metallic guttered sections M M, hinged together at $m\,m$ and provided with lugs $n\,n$, to which the ends of the spokes F F are pivoted at $o\,o$.

The tire P is preferably formed of a rubber tube, within which is inserted a flexible metal band Q, composed of links $q\,q$, connected by pivot-pins $r\,r$, so as to allow the composite tire to bend without collapsing or losing its shape.

The operation of my wheel is as follows: When the wheel is placed upon a vehicle-axle, the weight of the vehicle will be transmitted through the hub, air-cushion, and steel band G to the spoke-heads and through the spokes to the felly and tire. As the wheel revolves the felly will yield inwardly at each hinged joint as it reaches the ground, the joint rocking over the end of the spoke, which also yields, its upthrust being received by the steel band and air-cushion. The further turning of the wheel will gradually relieve the spoke of its load, the bottom section of the felly rocking over the spoke's end and yielding inwardly at the next joint as it reaches the ground. This movement permits the rim of the wheel to accommodate itself to the yielding of the spokes and the consequent shortening of the vertical diameter of the wheel. The rubber band I sustains the top of the air-cushion if under heavy loads or upon rough roads the top of the air-cushion is driven up by the spoke-head against the band.

Having thus described my invention, what I claim, and desire to secure by Letters Patent of the United States, is—

1. The combination, in a vehicle-wheel, of a rim embodying hinged sections, yielding piston-spokes, a centrally-located, pneumatic cushion to receive the separate and successive thrusts of the spokes, and a tire embodying a rubber casing surrounding a metal core composed of flat, pivotally-connected sections.

2. The combination, in a vehicle-wheel, of a rim embodying hinged sections, yielding piston-spokes, a centrally-located, pneumatic cushion to receive the separate and successive thrusts of the spokes, and a tire embodying a tubular, rubber casing surrounding a metal core composed of flat sections of uniform form pivotally connected to each other.

3. The combination, in a vehicle-wheel, of a flexible rim, yielding piston-spokes, and a pneumatic cushion surrounding the hub of the wheel and confined between rigid side walls and a flexible metallic top band.

4. The combination, in a vehicle-wheel, of a flexible rim, yielding piston-spokes, and a pneumatic cushion surrounding the hub of the wheel and confined between metallic disks, forming rigid side walls, and a flexible, metallic top band, and a solid, elastic bumper-band encircling the hub within the pneumatic cushion.

5. The combination, in a vehicle-wheel, of a flexible rim, yielding piston-spokes, tubular spoke-sleeves mounted upon a base-ring, a pneumatic cushion within said base-ring to receive the thrust of the spokes, and an elastic, metallic band encircling the pneumatic cushion within said base-ring.

6. The combination, in a vehicle-wheel, of a flexible rim, yielding piston-spokes, tubular spoke-sleeves mounted upon a base-ring, a pneumatic cushion within said base-ring to receive the thrust of the spokes, an elastic, metallic band encircling the pneumatic cushion within said base-ring, and rigid, metallic, side disks embracing said base-ring, band and cushion.

7. The combination, in a vehicle-wheel, of a flexible rim, yielding piston-spokes with expanded heads, tubular spoke-sleeves mounted upon a base-ring, an elastic metal band within said base-ring, a pneumatic cushion within said band, an elastic bumper within said cushion and surrounding the wheel-hub, and side disks embracing said base-ring, band and cushion.

8. The combination, in a vehicle-wheel, of a flexible rim, yielding piston-spokes with expanded heads, tubular spoke-sleeves mounted upon a base-ring, an elastic, metal band within said base-ring, a pneumatic cushion within said band, an elastic bumper within said cushion and surrounding a reinforcing-sleeve mounted upon the wheel-hub, and side disks embracing said base-ring, band and cushion.

9. The combination, in a vehicle-wheel, of a flexible rim, yielding piston-spokes with expanded heads, tubular spoke-sleeves mounted upon a base-ring, an elastic, metal band within said base-ring, a pneumatic cushion within said band, an elastic bumper within said cushion and surrounding a reinforcing-sleeve mounted upon the wheel-hub, and side disks embracing said base-ring, band and cushion, and secured by collar-nuts to the ends of the hub.

10. The combination, in a vehicle-wheel, of a hub, a pneumatic cushion surrounding the hub, an elastic bumper within said cushion, piston-spokes bearing upon the cushion, and a rim surrounding the outer ends of the spokes.

EDWARD KEYSER.

Witnesses:
WILLIAM H. MOHR,
BENJAMIN F. FARRAR.